UNITED STATES PATENT OFFICE.

WILLIAM T. BONNER, OF WASHINGTON, NORTH CAROLINA, ASSIGNOR OF ONE-HALF TO K. P. McELROY AND ROY F. STEWARD, BOTH OF WASHINGTON, DISTRICT OF COLUMBIA, AND MITFORD C. MASSIE, OF NEW YORK, N. Y.

PROCESS OF PRODUCING PLASTICS AND PRODUCTS OF SAME.

1,180,902.     Specification of Letters Patent.     Patented Apr. 25, 1916.

No Drawing. Application filed August 24, 1908, Serial No. 450,081. Renewed November 13, 1913. Serial No. 800,884.

*To all whom it may concern:*

Be it known that I, WILLIAM T. BONNER, a citizen of the United States, residing at Washington, in the county of Beaufort and State of North Carolina, have invented certain new and useful Improvements in Processes of Producing Plastics and Products of Same, whereof the following is a full, clear, and exact specification, such as will enable others skilled in the art to which it appertains to practice and make the same.

This invention relates to processes of producing plastics and products of same; and comprises a method of producing plastics and materials embodying such plastics, such method comprising the treatment of saponifiable oleaginous substances, either alone or in admixture with other reactive substances, with caustic alkali and with carbon disulfid, and a subsequent treatment to recover such oleaginous substances in a new, chemically altered, set or coagulated form suitable for plastic purposes; and said invention also comprises certain products of said method, said products consisting of or comprising such chemically altered, set or coagulated oleaginous substances; all as more fully hereinafter set forth and as claimed.

I have discovered that by treating saponifiable oleaginous substances or materials first with caustic alkali in relatively large amount and then with carbon disulfid, a reaction ensues resulting in the formation of new plastic bodies. The saponifiable matter enters into new combinations to produce bodies which give a thick, viscous or gelatinous solution in water. As to the chemical nature of this reaction or that of the products formed, I cannot say, contenting myself with noting observed facts without attempting theoretical explanations. From this thick and gelatinous solution, the oleaginous matter may be recovered in a new, chemically altered condition and in a set or solidified, or so to speak, coagulated form, no longer resembling the original oleaginous matter in saponifiability or other chemical properties.

Commercial red oil, or oleic acid, for instance, when treated with a solution of caustic soda and then with carbon disulfid goes into solution to form a thick viscous, gelatinous mass. This mass in time sets, alters or decomposes, or coagulates to produce a colloidal body insoluble in water and of characteristics adapting it for use in the arts, as for instance as a rubber substitute, for water proofing, and for other purposes. In the dry state it has about the consistence and appearance of soft rubber. Linseed oil produces a similar but harder composition. Other vegetable and animal oils and fats and fatty acids give like results. Rosin and similar saponifiable resins give similar results, though in the case of rosin itself, the product is harder than the product from oleic acid, having more nearly the consistency of gutta percha than that of rubber.

The decomposition or alteration which results in the new plastic is much accelerated by the action of heat, a temperature of 212° F. being sufficient to produce it very rapidly, in the case of the oleic derivatives. The character and properties of the product are varied, within limits, by small variations in time and temperature of heating. In the heating, carbon disulfid, and sometimes, sulfureted hydrogen escape while alkali is set free. The latter may be removed from the set plastic by washing. A similar alteration is produced at common temperatures by the action of such acids as sulfuric, hydrochloric, acetic, etc., these acids also causing the formation of the new set product. By treating the solution of the first reaction product with soluble salts, such as ammonium chlorid, zinc chlorid, calcium chlorid, alum, barium nitrate, lead acetate, etc., new products are formed, possibly by double decomposition, and these new products are still more readily decomposed than is the original sodium compound. In the decomposition of the compounds with such bases as zinc or lead, oxids are formed which remain admixed with the altered and set oleaginous body and serve as fillers.

In the setting by heat or acids of the stated product of alkali and carbon disulfid acting on oleaginous bodies, the new solid substance or substances formed take the shape of the containing vessel, and these products may therefore be used for plastic purposes. For such purposes, it is generally better, to obviate the effects of shrinkage in drying after alteration or coagulation, to admix such product with more or less filler, which may be an inert mineral substance like whiting, zinc white, permanent white, red ocher or other like material. For many purposes, a fibrous filler such as paper pulp, cotton, wool, or the like, used in combination with these altered oleaginous materials makes an excellent plastic combining the strength and general character of the fiber with the rubbery character of the matrix.

If desired, the original solution may be used to impregnate spun, felted or woolen textile fibers, canvas, or cloth being impregnated therewith and steamed to set or coagulate the oleaginous matter.

By passing the thick, viscous original solution through dies or orifices into a steam chamber or into a solution of an acid or salt, threads and filaments may be formed. The tensile strength of sheets or filaments formed from oily materials alone, that is without reinforcing cellulose, is however but small.

In preparing a solution of the new plastic material, 100 pounds of commercial red oil or oleic acid may be treated with 40 pounds of commercial caustic soda used as a saturated solution in water. The two are mixed and allowed to stand to saponify. Heat may be employed. The same quantity of linseed oil or other vegetable or animal oil or fat may be employed in lieu of the red oil. Red oil however makes a desirable article. The saponified mass is next cooled and treated with carbon disulfid. For the quantities indicated, 50 pounds of carbon disulfid may be employed. This is more than required, but the excess may be regained afterward, as it readily separates as a distinct layer. The disulfid and the saponified solution are thoroughly mixed by any convenient commercial stirring device, the mixture being kept quite cool, say at or below 60° though a few degrees in excess will do no harm during this treatment. On standing for several hours, the mixture becomes converted into a thick gelatinous solution from which the excess of disulfid separates. The solution on standing at 80° to 90° F. alters or gelatinizes and the alteration is very rapid at 212° F. The altered product takes the shape of the containing vessel but shrinks materially during drying unless the solution was mixed with fibrous or mineral fillers. The dried product is soft and rubbery, and may be freed from soda and salts by washing with water or weak acid.

When using caustic soda as the alkali, the solid substance may be precipitated unchanged from the original solution by mixing with dense brine, which exercises a salting out action. This salted-out precipitate may be employed by dissolving it in water to produce aqueous solutions of any desired strength and free from the excess of caustic alkali generally present in the original solution. Or it may be set or coagulated by steaming or washing with acid. Other alkalis than soda may be employed in making this solution. Caustic potash is suitable. Ammonia in water solution is less suitable. Dry liquid ammonia ($NH_3$) however, may be employed in treating the oleaginous material and though I am not sure that the reactions ensuing are the same or strictly analogous to those when soda solution is employed, yet the final results are similar. If oleic acid, linseed oil, rosin, etc., be treated with condensed dry ammonia, a reaction ensues with some development of heat which should be counteracted by suitable cooling. On now removing the excess of ammonia—best by the use of a vacuum—the product will take up carbon disulfid, used either as liquid or vapor. The product when treated with water will form a solution which is generally like, but specifically different from, that formed when using soda. The solution may be altered or coagulated in the same way as that of the product made with soda.

For many purposes, the product made with soda is better than that made with ammonia, while for other purposes the reverse is true. The solution made in the ammonia treatment has the distinct advantage for some purposes, that it is free from fixed soluble salts, and the coagulated oleaginous matter recovered therefrom on steaming needs no washing. In insulating wire for instance, the braid-covered wire may be impregnated with the solution formed after the ammonia treatment, steamed, dried and directly coiled.

A specific embodiment of my invention which offers many advantages in the arts is the combination of the described process with the production of recovered cellulose from "viscose" solutions. Viscose is ordinarily made by treating alkali cellulose with carbon disulfid and is a thick, viscid solution which yields a "recovered" cellulose on steaming, acidulating, etc. This recovered cellulose, while tough and strong, however suffers from the disadvantage that for many purposes it is too stiff, brittle and horny. But by preliminarily impregnating the cellulose with an oily body and then treating the mixture with alkali and with carbon disulfid both the viscose reaction and the reaction with the oily body take place simultaneously and the recovered cellulose later produced is thoroughly impregnated or imbued with the described altered or set oleagnious body, and the compound body so produced shares in the character of both, having the strength and toughness of the recovered cellulose with the softer character of the set oil. Its nature will of course depend in a measure on the relative proportions of the oil and cellulose employed. With a large proportion of oil the compound product is much like that from the oily body alone but is harder and stiffer. With a large proportion of cellulose, the plastic is more like leather.

The compound solution may be employed for making plastics, may be used with fillers, may be employed for making filaments and threads, or may be used for waterproofing and sizing. Its employment for making artificial leather is unusually advantageous. Sheets or strips of any desired dimensions may be made of the leathery product, enabling the production of all sorts of articles. In making belts, which may be of any length, a fibrous backing, such as canvas may be employed if desired.

The heavy solution of altered oil and the viscose solution may be separately made and then admixed, but because of the thick character of both, which renders mixing tedious and difficult, and because a better product is obtained, it is generally preferable to treat oil and cellulose together to form a compound solution. Whether this improvement in quality is due to a reciprocal action of the reagents or is due to a more intimate mixture of the substances, I cannot say, merely noting the fact.

A desirable type of mixture for many purposes, giving a resultant plastic which upon drying assumes the appearance of a hardish but pliable leather may be made by impregnating 100 pounds of cellulose, such as paper pulp, with 25 pounds of linseed oil or oleic acid, the latter being generally the better. The oiled cellulose is next treated with 50 pounds of commercial caustic soda dissolved in water to form a saturated solution. The mixture, which should be kept cool, say below 40° F., is thoroughly stirred and allowed to stand about 4 hours to permit interaction. It is then mixed with 40 to 50 pounds of carbon disulfid and the mixture allowed to stand two hours. The temperature must be kept low. At the end of this time, the thick solution is separated from the excess of carbon disulfid, which may be reused.

The solution will gelatinize at 80° to 90° F., and it is completely set by a short exposure to 212° F. Or it may be also set by acids and salts. For instance in making sheets and filaments, it may be squirted through dies or apertures into dilute hydrochloric acid. If the solution be mixed with fibrous or mineral fillers and heated to set or coagulate the compound colloid body contained, bodies like vulcanized rubber plastics may be obtained. Filaments and sheets obtained by heat coagulation are much like leather. By impregnating canvas, burlap or other cloth and subsequently steaming or otherwise heating, waterproof strong, pliable fabrics may be obtained. After setting the compound colloid completely, it should in general be thoroughly washed to remove soda and salts. In making sheets of this pliable recovered cellulose for use as leather substitute for shoes and belting, the thick solution may be placed in trays of suitable size and allowed to stand three to four hours at a temperature of about 120° to 150° or until coagulation has gone far enough to permit handling. The sheets removed from the trays may then be placed under a suitable press having heated press heads and slowly compressed until separated water is removed, bubbles, flaws and unevenness are obviated and coagulation is complete. The sheets removed will be like hardish but tough and pliable leather. By making the sheets from the trays somewhat longer than the press head so that an end laps out during the curing operation and placing the end of the next sheet treated in contact with this uncured end under the press, continuous, integral sheets of any length may be readily prepared. The whole operation may of course be made continuous by passing a slow stream of solution through a heated zone as a continuous sheet and curing this sheet as described after it has coagulated enough in passing through the heated zone to permit handling.

Excellent reinforced laminated belting may be made by placing a thin web or layer of cotton or wool, felted wool being particularly suitable, upon a sheet of partially set colloid in a tray, pouring in another thin layer of solution, after partial setting, placing another thin web thereon and adding another layer of unset colloid, and so on. Thin webs of felted cotton or wool are better for this purpose than fabric sheets like canvas, as permitting more laminæ. After forming the desired number of laminæ, the compound sheet is cured under a press as before.

Potash or other fixed alkali, may be substituted for soda in the foregoing example, but offers no great advantages. On the other hand, liquid anhydrous ammonia may be employed with distinct advantage for many purposes, as where it is not desired to wash the ultimate plastic product.

If 100 pounds of cellulose be impregnated with fatty oil as before and the oiled cellulose submerged in liquid ammonia ($NH_3$), a reaction of unknown nature occurs, generally with development of heat, so that artificial cooling is desirable. The cellulose and oil must be dry and free from moisture. It is desirable to heat the cellulose in a drying oven for some time previously. After the reaction, the oiled cellulose will frequently be found to be changed in appearance, the fibers being broken down to a powder. Upon completion of the reaction, the excess of liquid ammonia is drawn off and the cellulose is freed from residual gas with the aid of a vacuum pump. The product so obtained, if to be preserved, must be kept cold and dry and it is best worked up at once. Upon treatment with carbon disulfid as liquid or vapor, it reacts to form a body which will dissolve in water to form a solution having the general properties of that formed from the oiled soda cellulose. The plastic material formed on coagulation by heat however need not necessarily be washed since any residual ammonia can be removed in other ways.

In either method of operation, the properties of the ultimate compound plastic produced will depend largely upon the ratio between the original oil and the cellulose. For most purposes I prefer some cellulose mixed with the oil which is to be converted into the set, coagulated and chemically altered and colloided oily body, to reinforce the plastic, since with many oils used without co-treated cellulose, the colloided product is apt to be deficient in tensile strength unless reinforced with a fibrous filler. On the other hand, when using the cellulose there should not be less than 10 to 15 per cent. oil employed therewith. The 25 per cent. oleic acid given in the previous examples gives a desirable plastic for most purposes. Oleic acid is a desirable oleaginous body for the present purposes as it gives plastics of good physical properties, but many other oils and fats may be used in its lieu such as castor oil, tung, or "Chinese wood oil," corn oil, mustard seed oil, peanut oil, cottonseed oil, palm oil, cocoanut oil, recovered grease, tallow, etc.

What I claim is:—

1. The process of preparing plastics which comprises treating a material comprising an oleaginous body with caustic alkali and with carbon disulfid to form a colloid solution and coagulating said colloid solution to form a plastic.

2. The process of preparing plastics which comprises treating a material comprising an oleaginous body with fixed caustic alkali and with carbon disulfid to form a colloid solution and coagulating said colloid solution to form a plastic.

3. The process of preparing plastics which comprises treating a material comprising an oleaginous body with caustic soda and with carbon disulfid to form a colloid solution and coagulating said colloid solution to form a plastic.

4. The process of preparing plastics which comprises colloiding a material comprising a fatty oil with caustic soda solution and with carbon disulfid to form a colloid solution and coagulating said colloid solution to form a plastic.

5. The process of preparing plastics which comprises treating an oleaginous body and of cellulose with alkali and with carbon disulfid, and coagulating the alkaline admixture to form a pliable plastic.

6. The process of preparing plastics which comprises colloiding a mixture of an oleaginous body and cellulose with caustic alkali and with carbon disulfid to form a colloid solution and coagulating said colloid solution to form a plastic.

7. The process of preparing plastics which comprises colloiding a mixture of an oleaginous body and cellulose with fixed caustic alkali and with carbon disulfid to form a colloid solution and coagulating said colloid solution to form a plastic.

8. The process of preparing plastics which comprises colloiding a mixture of an oleaginous body and cellulose with caustic soda and with carbon disulfid to form a colloid solution and coagulating said colloid solution to form a plastic.

9. The process of preparing reinforced plastics which comprises colloiding a mixture of an oleaginous body and cellulose with caustic alkali and with carbon disulfid to form a colloid solution, adding reinforcing fiber and coagulating the colloid solution to form a plastic.

10. As a new composition, a plastic mass comprising a soft and rubbery coagulum from a compound of oleaginous matter, alkali and carbon disulfid.

11. As a new composition, a plastic mass comprising intimately commingled recovered cellulose and a coformed coagulum from a compound of oleaginous matter, alkali and carbon disulfid.

12. As a new article a body of commingled recovered cellulose and a coformed coagulum from a compound of oleaginous matter, alkali and carbon disulfid, said body containing reinforcing fiber.

13. In the manufacture of plastics the process which comprises treating material comprising a saponifiable oleaginous body or resin with more caustic alkali than is required for saponification and with carbon disulfid.

14. In the manufacture of plastics the process which comprises treating material comprising a saponifiable oil with more caustic alkali than is required for saponification and with carbon disulfid.

15. In the manufacture of plastics the process which comprises treating material comprising a saponifiable oleaginous body or resin with more caustic soda than is required for saponification and with carbon disulfid.

16. In the manufacture of plastics the process which comprises treating material comprising a saponifiable oil with more caustic soda than is required for saponification and with carbon disulfid.

17. In the manufacture of plastics the process which comprises treating material comprising red oil with more caustic alkali than is required for saponification and with carbon disulfid.

In testimony whereof, I affix my signature in the presence of two subscribing witnesses.

WILLIAM T. BONNER.

Witnesses:
C. W. FOWLER,
K. P. McELROY.